(12) United States Patent
Dash et al.

(10) Patent No.: US 8,390,616 B1
(45) Date of Patent: Mar. 5, 2013

(54) MARKERS FOR IDENTIFYING PROJECTED GRAPHICS OBJECTS IN OBJECT STREAMS

(75) Inventors: Sambit Kumar Dash, Noida (IN); Anupam K. Garg, Noida (IN)

(73) Assignee: Adobe Systems Incorporated, San Jose, CA (US)

( * ) Notice: Subject to any disclaimer, the term of this patent is extended or adjusted under 35 U.S.C. 154(b) by 781 days.

(21) Appl. No.: 10/637,736

(22) Filed: Aug. 7, 2003

(51) Int. Cl.
*G06T 15/00* (2011.01)
(52) U.S. Cl. .................. 345/419; 345/418; 345/420
(58) Field of Classification Search .................. None
See application file for complete search history.

(56) References Cited

U.S. PATENT DOCUMENTS

| | | | | |
|---|---|---|---|---|
| 4,658,247 A | * | 4/1987 | Gharachorloo | 345/560 |
| 5,581,670 A | * | 12/1996 | Bier et al. | 715/856 |
| 5,734,384 A | * | 3/1998 | Yanof et al. | 345/424 |
| 5,748,192 A | * | 5/1998 | Lindholm | 345/649 |
| 5,867,168 A | * | 2/1999 | Seki et al. | 345/427 |
| 5,877,768 A | * | 3/1999 | Jain | 345/421 |
| 6,198,487 B1 | * | 3/2001 | Fortenbery et al. | 345/420 |
| 6,867,787 B1 | * | 3/2005 | Shimizu et al. | 345/629 |
| 7,814,436 B2 | * | 10/2010 | Schrag et al. | 715/851 |

OTHER PUBLICATIONS

Bell, B., Feiner, S., Hollerer, T., View Management for Virtual and Augmented Reality, Nov. 2001, Proceedings of the 14th ACM Symposium on User Interface Software and Technology, pp. 101-110.*

* cited by examiner

*Primary Examiner* — Said Broome
(74) *Attorney, Agent, or Firm* — Fish & Richardson P.C.

(57) ABSTRACT

Methods and apparatus, including computer program products, for processing graphics objects in a model space with more than two dimensions. Information specifying a first view of the model space is received. The first view is defined by a projection of a first subspace of the model space onto a two-dimensional space. The first subspace includes at least a portion of two or more graphics objects. One or more markers are defined for the first view in the first subspace. Each marker for the first view is associated with at least one graphics object in a processing sequence for the first view. An object stream is generated, which includes projected objects that describe markers and graphics objects in the first view and are arranged in the object stream according to the processing sequence for the first view. Markers for the first view can be defined outside of any other view.

48 Claims, 4 Drawing Sheets

MARKERS FOR IDENTIFYING PROJECTED GRAPHICS OBJECTS IN OBJECT STREAMS

BACKGROUND

The present invention relates to processing digital graphics objects.

Digital graphics objects are graphics objects, i.e., objects in a two or more dimensional space, that are represented by digital data. Digital graphics objects can be processed by computer applications that support graphics. For example, computer applications can include graphics components, e.g., graphics user interfaces, and/or can be developed explicitly for graphics applications, such as drawing, painting, illustration, presentation, design, animation or simulation. Computer applications typically process two-dimensional graphics objects, but some applications—e.g., some computer aided design ("CAD"), animation, and simulation applications—can process graphics objects in more than two dimensions, typically in three dimensions representing the dimensions of the "real space." In some applications, one or more dimensions of the three-dimensional space have only discrete values. For example in CAD applications, a multi-level building or a multiple-layer integrated circuit can be represented by a model space that includes a number of parallel two-dimensional layers and connections between adjacent layers.

To represent a three-dimensional space on the two-dimensional surface of a sheet of paper or the screen of a display device, the three-dimensional space is projected onto a two-dimensional space, called paper space. A projection is a mapping that reproduces in a lower (e.g., two) dimensional space objects that are defined in a higher (e.g., three) dimensional space. The projection is typically performed by the application that processes the three-dimensional objects. In standard projections, called views, such as top, side, isometric or perspective views, graphics objects in a subspace of the model space are projected onto the paper space. Typically, the graphics objects in the subspace are processed according to a predetermined order, such as an order in which they were created. The projected (i.e., two-dimensional) objects can be further processed with the same or a different application. For example, the projected objects can be organized into a print stream by a printing component, or further processed by a graphics application that supports two-dimensional graphics.

SUMMARY

Markers are defined in relation to graphics objects in a two- or higher-dimensional model space, and the markers can be used to identify the graphics objects when the objects are projected into a two-dimensional view of the model space. In general, in one aspect, the invention provides methods and apparatus, including computer program products, implementing techniques for processing graphics objects in a model space that has more than two dimensions. The techniques include receiving information that specifies a first view of the model space. The first view is defined by a projection of a first subspace of the model space onto a two-dimensional space. The first subspace includes at least a portion of two or to more graphics objects. One or more markers are defined for the first view in the first subspace. Each marker for the first view is associated with at least one graphics object in a processing sequence for the first view. An object stream is generated, which includes projected objects that describe markers and graphics objects in the first view and are arranged in the object stream according to the processing sequence for the first view.

Particular implementations can include one or more of the following features. Information specifying one or more further views of the model space can be received. Each of the further views can be defined by a projection of a further subspace of the model space onto the paper space. Defining one or more markers for the first view can include defining one or more markers at one or more first positions in the first subspace. The one or more first positions can be positions that are outside of the subspace corresponding to any of the further views. One or more markers can be defined for a second view of the model space. The second view can be defined by a projection of a second subspace of the model space, and the second subspace can include at least a portion of two or more graphics objects. Each marker for the second view can be associated with at least one of the graphics objects in a processing sequence for the second view. The one or more markers for the second view can be defined at one or more second positions in the second subspace. The one or more second positions can be positions that are outside of the subspace corresponding to other views of the model space. Generating an object stream can include generating an object stream including projected objects that describe markers and graphics objects in the second view and are arranged in the object stream according to the processing sequence of the second view. Defining one or more markers for the first view can include sequentially creating a copy of each of the graphics objects in the first subspace according to the processing sequence of the first view, and creating a marker associated with at least one of the copies in the processing sequence. Generating an object stream can include generating a print stream representing the first view in the paper space.

A representation of the first view can be generated based on the object stream. The representation of the first view can include a two-dimensional projection of at least a portion of each of the graphics objects in the first subspace. Generating a representation of the first view can include identifying each of the markers for the first view in the object stream, and identifying the graphics objects associated with the identified markers. Generating a representation of the first view can include, for each identified marker, creating a tag in the representation in place of the corresponding marker, where each tag is associated with one or more of the identified graphics objects in the representation. The tags can be used to select one or more of the identified graphics objects in the representation. The selected objects can have one or more attributes. One or more of the attributes of the selected objects can be altered. Attributes of the selected objects can include color and/or opacity of one or more of the selected objects.

The invention can be implemented to realize one or more of the following advantages. Projected objects that represent three-dimensional objects in one or more views can be identified in an object stream generated from the corresponding view, and in any subsequent representation derived from the object stream. Three-dimensional objects can be identified even if shapes of the corresponding projected objects are different in different views. A projected three-dimensional object can be identified in a view even if only a portion of the object is in the view. Three-dimensional objects can be identified without calculating shapes of the projected objects corresponding to the three-dimensional objects in one or more views. In the object stream, markers can group multiple projected objects to represent a single three-dimensional object or a group of objects. Different markers can be defined for different views. A marker for identifying objects in a particular view can be defined such that it will appear only in the particular view, so it does not confuse identifying objects in any other views. For overlapping views, a single marker can be used to identify objects in each of the overlapping views. An application can use any technique to generate the object stream of the projected objects, provided that the technique follows a predetermined processing sequence. By using the markers, a marked-up representation can be generated based on the object stream. For example, the projected markers can be replaced with tags to identify the graphics objects. In the marked-up representation, the objects can be selectively processed, e.g., printed, highlighted, and gradually or fully deleted.

The details of one or more implementations of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
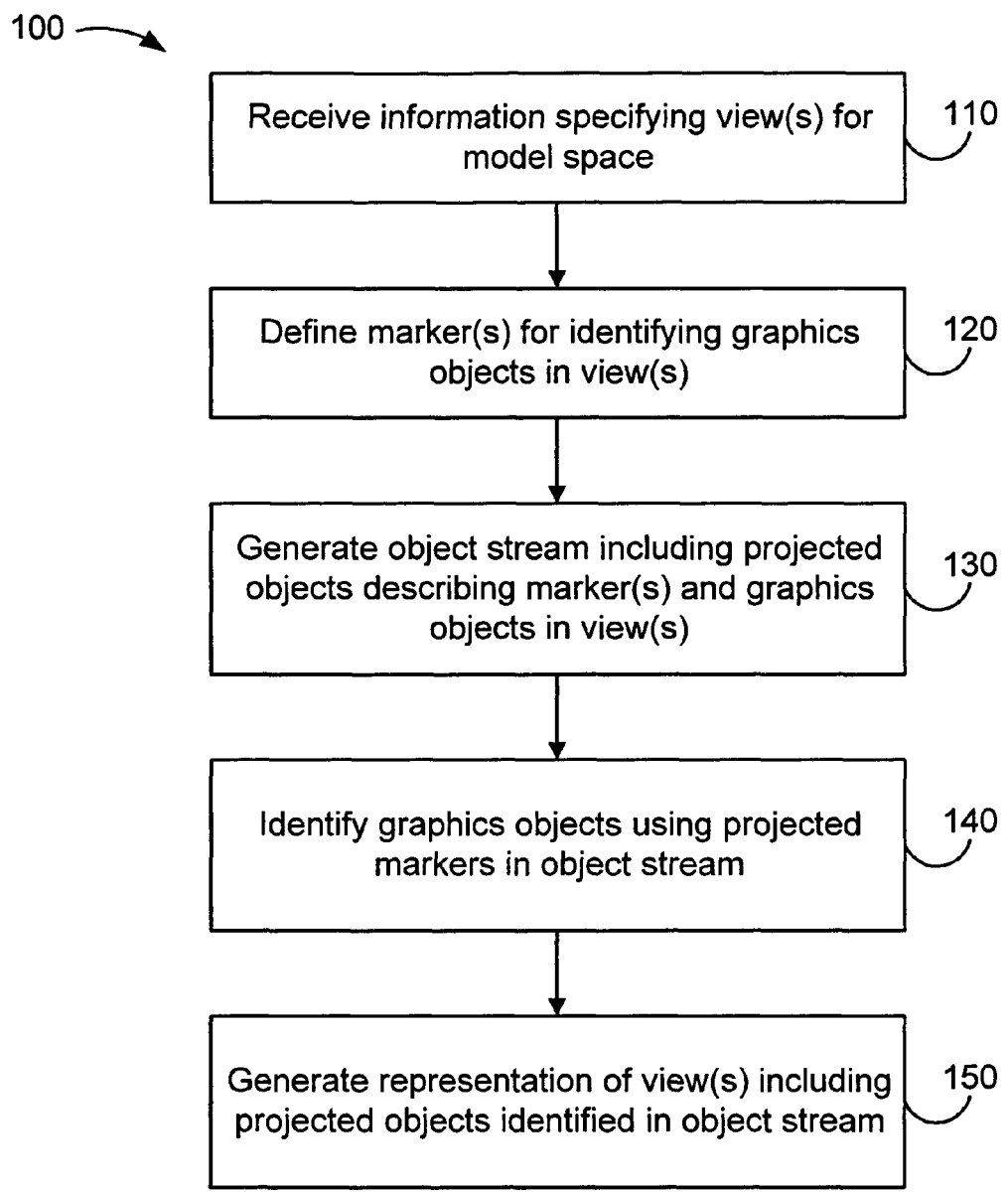
FIGS. 1-2 are schematic flow diagrams showing methods for processing graphics objects.

FIG. 1 shows a method 100 for processing graphics objects that are defined in a model space that has more than two dimensions (e.g., three dimensions). The method 100 can be performed, e.g., by a computer system that is configured to process more than two-dimensional graphics objects. In one implementation, the system includes a "3D application" (e.g., AutoCAD® of Autodesk Inc, San Rafael, Calif.) for manipulating three-dimensional graphics objects and a "2D application" (e.g., Adobe Acrobat® of Adobe Systems Incorporated, San Jose, Calif.) that receives two-dimensional graphics objects generated from the three-dimensional objects by the 3D application and further processes the received two dimensional objects. In alternative implementations, the method 100 can be performed by an application including both 3D and 2D components. For example, a 2D component can be a plugin that processes two-dimensional objects.

The model space can be described by a coordinate system that has an independent coordinate for each dimension of the model space. Each of the coordinates can have continuous or discrete values. Optionally, the model space can have more than three dimensions, e.g., in addition to the three spatial dimensions, the fourth dimension can describe time, or the model space can correspond to a non-physical space, e.g., in a mathematical model, that has more than three dimensions.

In the model space, the graphics objects can be objects defined in the same dimensions as the model space or in fewer dimensions. For example, a three-dimensional model space can include graphics objects having zero dimensions (i.e., a point), one dimension (i.e., a line), two dimensions (i.e., a surface), or three dimensions (i.e., a solid). Optionally, one or more graphics objects can have fractional dimensions (i.e., the graphics objects can include fractals). The graphics objects can be defined by mathematical constructs, as vector graphics objects, or as raster graphics objects.

The system receives information specifying one or more views for the model space (step 110). The information can be received from a user, another application, or a memory location storing, e.g., default parameters for one or more views. A view is defined by a projection of a subspace in the model space onto a two-dimensional paper space. The subspace of a view is projected onto a viewport, which can be represented as a window having a predefined shape, e.g., a rectangle, in a two-dimensional surface. The one or more views can be specified, e.g., by a 3D application and/or user input using conventional techniques.

In one implementation, a view, such as a side view, a top view, or an isometric view, is defined by a projection of an elongated prism in the model space. Objects in the prism are projected parallel to an axis of the prism onto a viewport that can be a perpendicular or any other cross section of the prism. In an alternative implementation, a view, such as a perspective view, can be defined by a projection of a pyramid. Objects in the pyramid are projected from the top onto the base of the pyramid. Optionally, a view can be defined by a projection of a subspace that is defined by curved surfaces. For example, the projection can be defined along curved lines.

In one implementation, the received information can explicitly specify a subspace that is projected onto a viewport to define a view. Alternatively, the received information specifies a viewport and a direction or a point for the projection, and the system can calculate the subspace that is projected onto the viewport. Optionally, the received information can specify that, instead of an entire subspace defining the view, only portions, e.g., selected sections, are projected onto a viewport of the view. In addition, multiple views can have a common viewport, each view projecting a different subspace onto the common viewport.

The system defines one or more markers in one or more views (step 120). The markers can be used to identify the graphics objects in the view as will be described in more detail below. Each marker is defined as a graphics object in the model space. In one implementation, a marker is a high symmetry object, such as a point or a sphere, whose projected shape in a view is independent of a direction of the projection defining the view. By using a high symmetry object as a marker, the system can avoid calculating projected shapes of the marker for different views. Alternatively, the marker can be a low symmetry object, e.g., a line or a cube, whose projected shape can be different in different views.

To identify a graphics object or objects in a view, a marker for the view can be defined with a predetermined relationship to the object or objects—for example, to be adjacent to the graphics object or objects—in a processing sequence for the view. A processing sequence specifies an order for processing graphics objects in the model space. In one implementation, a global processing sequence specifies a global ordering for all graphics objects in the model space, and a processing sequence for a view is based on the global processing sequence. For example, graphics objects in a subspace can be ordered for processing according to the global processing sequence. Alternatively, different processing sequences can be defined for different views. In one implementation, the processing sequence is based on metadata about the graphics objects. For example, some 3D computer applications, such as AutoCAD, use creation times of the graphics objects to specify a processing sequence. That is, the graphics objects are processed in the order in which they were created in the model space. Alternatively, the system can explicitly specify the processing sequence. A method for generating a marked representation of the model space with a particular processing sequence is discussed with reference to FIG. 2.

In one implementation, a pair of markers is defined to delineate one or more graphics objects in a view: a first marker precedes and a second marker follows the delineated graphics objects in the processing sequence. A first copy and a second copy of the same marker can be used as the first marker and the second marker, respectively, as shown in the exemplary implementation of FIG. 3B. Alternatively, the first and second markers can be different. For example, different markers can be designated to signal the beginning and the end of marked graphics objects in the processing sequence. By using a pair of markers, multiple graphics objects can be grouped together. For example, a cube can be delineated as a single object even if the cube is represented, e.g., by six graphics elements, each corresponding to a face of the cube. In alternative implementations, a single marker can be associated with each graphics object to be marked. For example, the marker can immediately precede (or follow) the associated graphics object in the processing sequence. In one implementation, different markers are used to mark single graphics objects or groups of graphics objects.

Figure 3A:
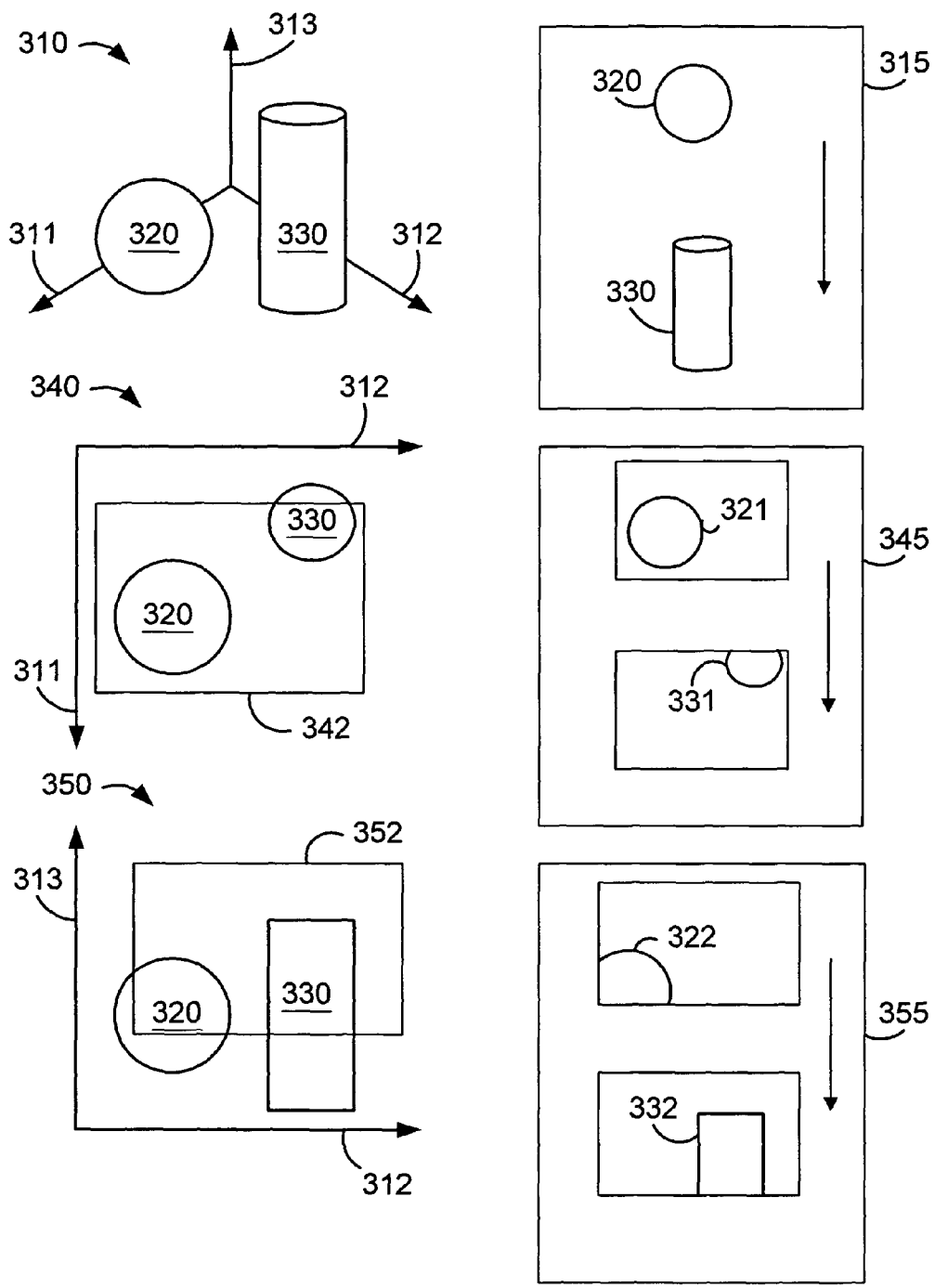
FIGS. 3A and 3B are schematic diagrams illustrating an exemplary implementation of identifying projected graphical objects in an object stream.
Figure 3B:
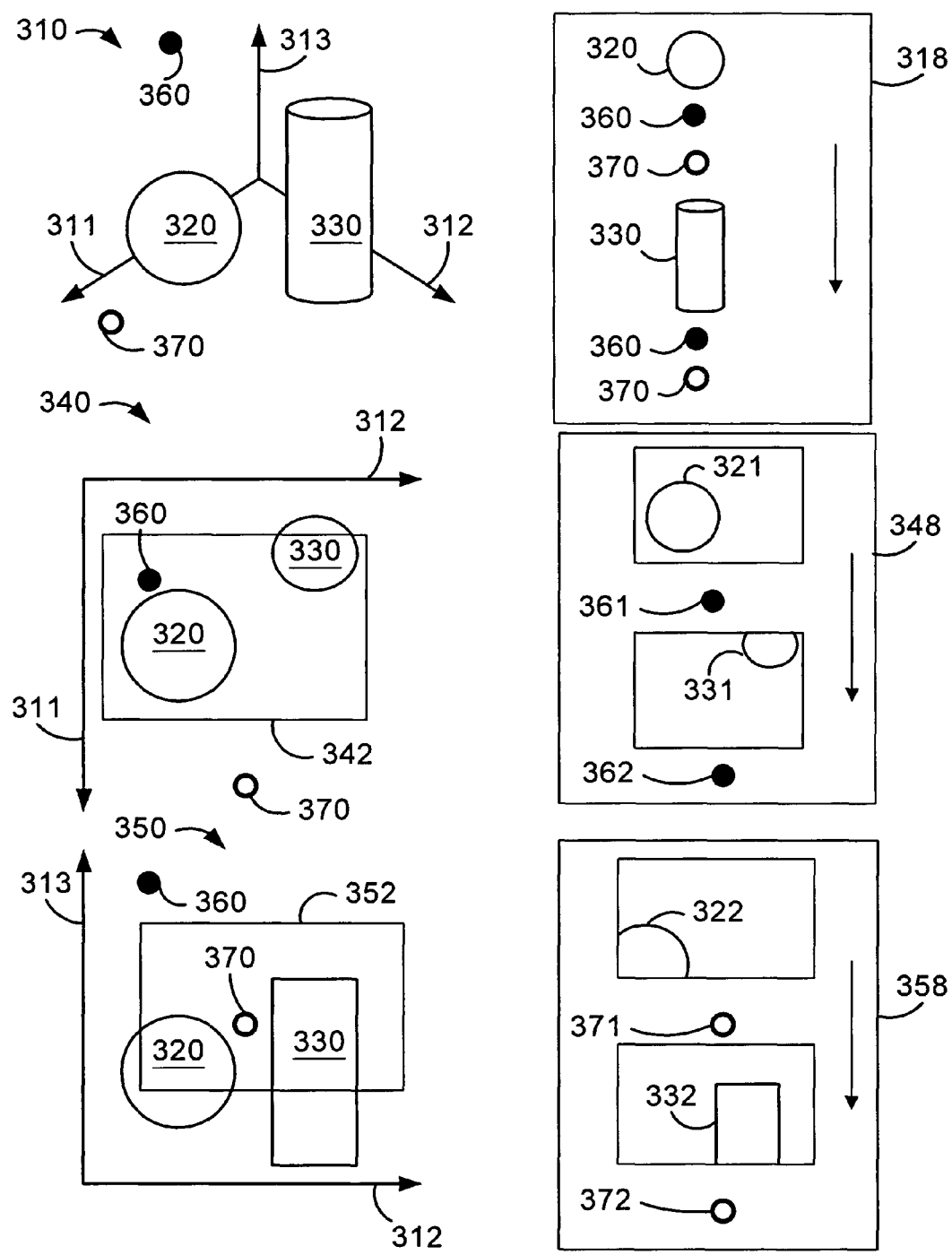

A marker for a view is defined in the same subspace from which the view is derived (see, e.g., FIG. 3B). Where multiple views are specified by the received information, the system can define one or more markers for each view separately. For example, a marker for a first view can be defined at a location that is within the first view, but outside of the subspace of any other view. To find locations that are inside a first subspace but outside of other subspaces, the system can subtract from the first subspace all the other subspaces using, e.g., geometrical calculations or standard three-dimensional Boolean subtraction operations.

Alternatively, the system can use stochastic methods to find positions for the markers. For example, the system can randomly generate locations in the first subspace until a generated location is outside of all the other subspaces. By having a marker that is only in the subspace of one view and outside of the subspace of any other view, the marker is projected only in the view where it is used to identify graphics objects and cannot affect (i.e., confuse) the identification of graphics objects in any other view.

Optionally, the system can define a marker for a view in a subspace corresponding to the view without verifying whether the marker is in other views. In such implementations, a view may include not only markers for the view but also markers for other views. To identify markers for a particular view, the system can associate different marker features with different views. For example, markers for different views can have different colors, shapes, or sizes. Alternatively or in addition, markers for different views can have different locations in the model space, and the system can calculate projected locations of different markers for each view.

In alternative implementations, a common marker can be defined for multiple views if the multiple views are defined by subspaces that overlap in a single common region in which the common marker can be positioned. A location in the common region can be found, e.g., using geometrical calculations, standard three-dimensional Boolean operations, or stochastic methods. By having a marker in the common region of the multiple views, the marker can be used to identify graphics objects in each of the views, i.e., there is no need for separate markers for different views. For views that are defined by subspaces that do not overlap in the common region (e.g., do not overlap at all with the subspaces of the multiple views or overlap with one or more subspaces outside the common region), the system can define separate markers in each subspace, e.g., outside of any other subspace that defines a view.

The system generates an object stream including projected objects that describe the graphics objects and markers in one or more views of the model space (step 130). An object stream is a serialization (i.e., a serial arrangement) of objects, and a projected object is an object in the paper space describing in a view a corresponding graphics object in the model space. The system can generate the object stream in response to a request that requires generating a two-dimensional representation of the one or more views (e.g., printing a document that includes one or more views of the model space). The object stream can be generated, e.g., by a 3D application that projects graphics objects in the model space according to the views. In one implementation, the 3D application generates an object stream for printing one or more views of the model space. The 3D application can use any technique to generate the object stream, provided that the technique follows the processing sequence to generate the object stream. For example, the 3D application can generate object streams for printing in which the graphics objects are ordered according to a predetermined processing order, such as specified by creation times of the objects.

The object stream includes projected objects arranged according to the processing sequence. For a single view, the system arranges the projected objects in the object stream according to the processing sequence for the graphics objects in the view. For multiple views, the object stream can include a sub-stream for each view, where each of the sub-streams includes the projected objects of the corresponding view according to the processing sequence. The sub-streams can be ordered arbitrarily relative to each other. Because the projected objects are arranged according to the processing sequence, if a marker is adjacent to a graphics object in the processing sequence for the view, the projected object describing the marker, i.e., the projected marker, will be adjacent to the projected object describing the graphics object in the object stream. Exemplary implementations of generating object streams are discussed with reference to FIGS. 3A and 3B.

The system identifies graphics objects in the object stream using the projected markers (step 140). For example, a 3D graphical object can be associated with a pair of markers that bracket the 3D object in a processing sequence for a view. To identify a projected object that describes the 3D object in the view, the system can identify the corresponding pair of projected markers in the object stream. Because the order is the same in the processing sequence and in the object stream, the 3D graphical object is described by the projected object that is bracketed by the pair of projected markers in the view. Alternatively or in addition, the system can identify a projected object in the object stream with a single projected marker. For example, the projected marker can precede or follow an associated projected object, depending on the convention of associating markers and graphics objects.

The projected markers can be identified in the object stream based on characteristic properties of the markers. For example, a marker in the model space can include an isolated point that is projected in any view to an isolated point in the paper space, and the system can identify the isolated points in the object stream as copies of the projected marker. Alternatively, a marker can be a sphere that is projected to a circle of a particular size in any view defining parallel projection, and the system can identify circles of the particular size as copies of the projected marker. Optionally, the characteristic properties of the projected markers can depend on the view, and the system can calculate such characteristic properties to identify the projected markers.

The system generates a representation of one or more views that include the projected objects identified in the object stream (step 150). In one implementation, the representation is generated by marking up the identified graphics objects with tags in the object stream. For example, a pair of projected markers can be replaced by an opening and a closing portion of a tag to mark up one or more projected objects delineated by the pair of markers in the object stream. The system can use the same or different tags for different views. In alternative implementations, the representation can include a subset of the identified graphics objects in the object stream.

In a marked-up representation, the projected graphics objects can be selectively processed, for example, as individual objects or groups of objects, depending on how the markers are originally defined. In one implementation, a user can select one or more identified graphics objects in a view and alter one or more attributes of the selected objects. For example, a color or opacity of one or more identified graphics objects can be changed without changing the color and opacity of other graphics objects in the view.

Figure 2:
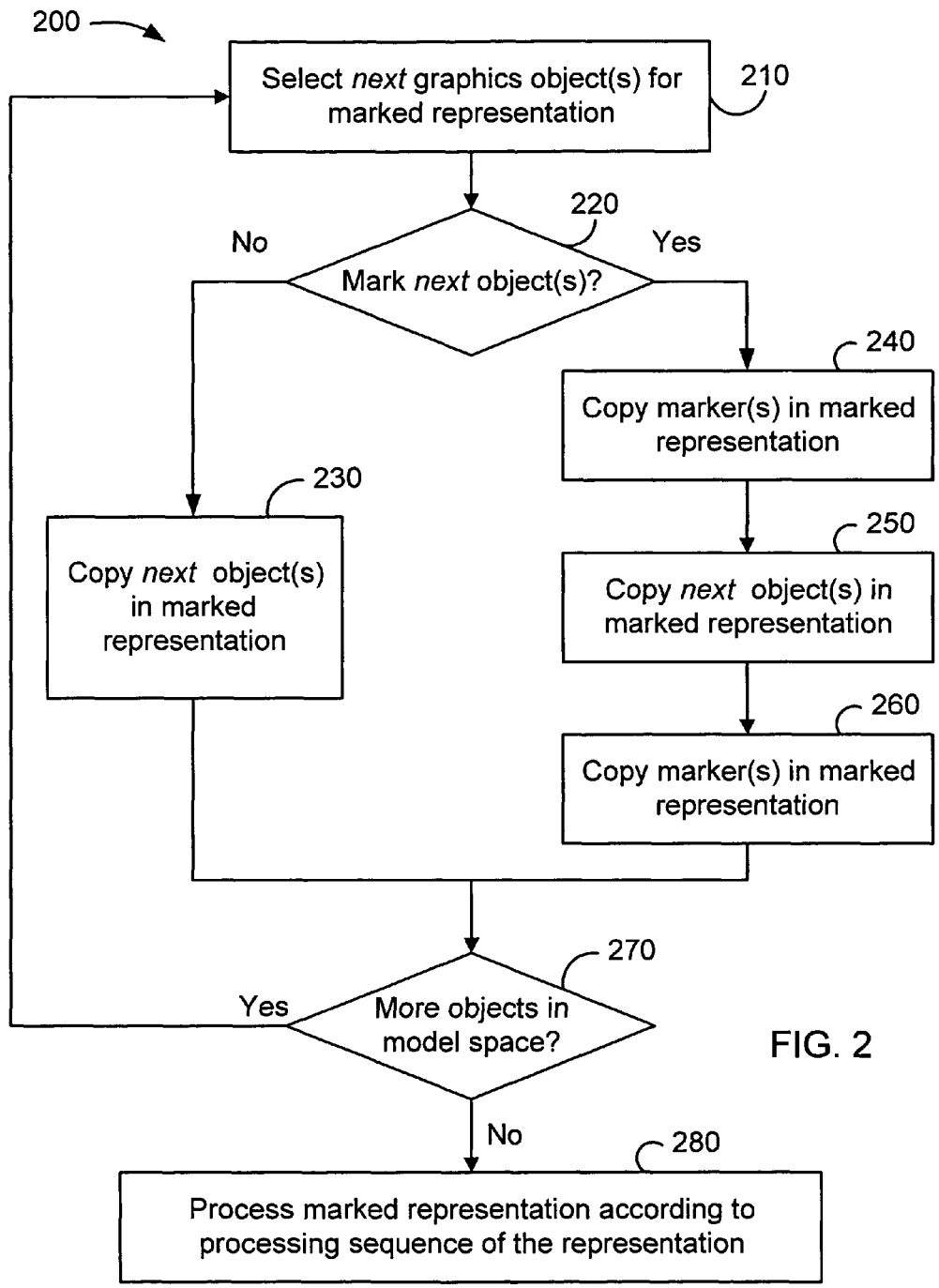

FIG. 2 shows an iterative method 200 for generating a marked representation of a model space with a particular processing sequence for graphics objects in the model space. In the marked representation generated by the method 200, the graphics objects in the model space are organized in a sequence that is ordered according to creation times of the graphics objects, and includes markers that can be used to identify graphics objects in one or more views. The method 200 can be used by a system to generate a marked representation of the model space for a computer application, such as AutoCAD, that processes multiple graphics objects according to their order of creation.

The system selects one or more next graphics objects in the model space for the marked representation in each iteration (step 210). Each of the next graphics objects is a graphics object that has not been selected previously for the processing sequence. In one implementation, a single next graphics object is selected in each iteration according to an order of creation times, for example, by starting with a graphics object having the earliest creation time. Alternatively, the graphics objects can be selected in any other order.

Optionally, the system can receive user input for selecting one or more next graphics objects for the marked representation. In addition, the system can recognize that multiple graphics objects are grouped together to define a composite object, e.g., a cube that is defined by the six faces, and select all the graphics objects that define the composite object. The system decides whether the next graphics objects should be marked (decision 220). For example, the system can receive user input indicating whether the next object should be marked or unmarked. Alternatively or in addition, the system can base the decision 220 on predetermined conditions. For example, the system can evaluate a characteristic, e.g., color, position, or size, of one or more of the next graphics objects, and compare the evaluated characteristic to a predetermined value to make the decision 220. For example, the system can mark only graphics objects that appear in one or more predetermined views. In addition, the graphics objects can have proprietary attributes, such as layer identifiers, that can be used to decide if the graphics object should be marked or not.

If the next objects should not be marked ("No" branch of decision 220), the system creates copies of the next objects in the marked representation (step 230). If the next object should be marked in one or more views ("Yes" branch of decision 220), the system creates copies of corresponding markers in the marked representation (step 240). In one implementation, the system specifies a separate marker for each of multiple views of the model space, and creates a copy of a marker for each view without verifying whether any of the next graphics objects is in the view. Alternatively, the system can determine the views in which any of the next graphics objects appears and create copies of markers for only those views. The markers can be defined before starting to generate the processing sequence or during generating the processing sequence, e.g., a marker can be defined when a first copy of it is created.

After creating the markers, the system creates copies of the corresponding objects (step 250) and subsequently creates copies of one or more markers (step 260) in the marked representation. In one implementation, the same markers are copied before and after the corresponding objects in the marked representation. Alternatively, different markers can be defined to precede and follow a graphics object in the sequence of the marked representation. For example, a pre-marker and a post-marker can be defined for each view to signal a start and an end, respectively, of a group of graphics objects in the processing sequence.

In alternative implementations, step 240 or step 260 can be omitted. In such implementations, each marker is associated with a single graphics object. For example, by omitting step 240 or 260, each marker can be associated with a graphics object that precedes or follows, respectively, the marker in the processing sequence of the marked representation. The associated graphics object can be an individual graphics object to be identified, or a first or last graphics object of a group to be identified. In one implementation, the system uses a single marker type that can be used to identify a single graphics object that is associated with the marker. Alternatively, the system can use multiple marker types. For example, two marker types can be used to identify a group of graphics objects in the processing sequence. A first marker type is associated with a first object of the group and the second marker type is associated with a last object of the group in the processing sequence. Furthermore, different marker types can be used to identify individual graphics objects or a group of graphics objects.

The system verifies whether the model space includes graphics objects that have not been considered previously for the processing sequence (decision 270). If there are such graphics objects ("Yes" branch of decision 270), the system returns to selecting one or more next graphics objects for the marked representation in step 210. If all graphics objects have been considered previously for the marked representation ("No" branch of decision 270), the system processes the graphics objects in the marked representation according to the processing sequence of the representation, i.e., according to the order in which the objects to were created (step 280).

FIG. 3A illustrates a three-dimensional model space 310, along with a top view 340 and a side view 350 of the model space. The model space 310 has an x-axis 311, a y-axis 312, and a z-axis 313 defining an x direction, a y direction, and a z direction, respectively. In the example, the model space 310 includes two graphics objects: a sphere 320 and a cylinder 330. The graphics objects 320 and 330 are ordered according to a processing sequence 315, where the sphere 320 precedes the cylinder 330. In one implementation, the processing sequence 315 is defined by creation times, and the sphere 320 has been created before the cylinder 330.

The top view 340 is defined by a projection in the z direction, i.e., parallel to the z-axis 313. In the top view 340, the graphics objects 320 and 330 are projected onto a viewport 342. The viewport 342 is a rectangle in a two-dimensional plane parallel to the plane defined by the x-axis 311 and the y-axis 312. Accordingly, the top view 340 is defined by the projection of a subspace, in this example, a prism, that has a rectangular cross section and extends parallel to the z-axis 313. In one implementation, the prism is defined to extend from minus to plus infinity in the z direction and the viewport 342 is at plus infinity in the z direction. Alternatively, the prism can be defined to include only a finite range in the z direction. Optionally, the prism can be cut into multiple sections, and the view can be defined by a projection from selected sections only.

In the top view 340, graphics objects are processed according to a processing sequence defined by an object stream 345. The object stream 345 includes two projected objects: a circle 321 and a circle fraction 331 describing the sphere 320 and the cylinder 330, respectively, in the top view 340. That is, the sphere 320 is projected onto the circle 321 and the cylinder 330 is projected onto the circle fraction 331 within the viewport 342. The shape of the circle fraction 331 is determined by the fraction of the cylinder 330 that is inside the viewport 342.

The side view 350 is defined by a projection in the x direction, i.e., parallel to the x-axis 311. In the side view 350, the graphics objects 320 and 330 are projected onto a viewport 352. The viewport 352 is a rectangle in a two-dimensional plane parallel to the plane defined by the y-axis 312 and the z-axis 313. Accordingly, the side view 350 is defined by the projection of a rectangular prism that extends parallel to the x-axis 311. Similar to the top view 340, the prism can be infinite or can include one or more finite ranges in the x direction.

In the side view 350, graphics objects are processed according to a processing sequence defined by an object stream 355. The object stream 355 includes two projected objects: a circle fraction 322 and a rectangle 332 describing the sphere 320 and the cylinder 330, respectively, in the side view 350. The shape of the circle fraction 322 and the rectangle 332 are determined by the fraction of the sphere 320 and the cylinder 330 that is inside the viewport 352.

As shown in the views 340 and 350, the shape of a projected object may not be characteristic to a three-dimensional object that is described by the projected object. For example, the circle fraction 331 does not have a fully circular shape, as expected for a top view of a cylinder, because only a fraction of the cylinder 330 is within the subspace of the view. Furthermore, the cylinder 330 has different projected shapes in different views.

The object streams 345 and 355 for the top view 340 and the side view 350, respectively, define processing orders according to the processing sequence 315. Alternatively, different processing orders can be defined for different views. In the object stream 345, the circle 321 precedes the circle fraction 331, because the circle 321 describes the sphere 320 that, according to the processing sequence 315, precedes the cylinder 330 described by the circle fraction 331. Similarly in the object stream 355, the circle fraction 322 precedes the rectangle 332, because the circle fraction 322 describes the sphere 320 and the rectangle 332 describes the cylinder 330 that follows the sphere 320 according to the processing sequence 315.

FIG. 3B illustrates generating a representation that includes objects and markers arranged according to a processing sequence in an object stream. In the example shown in FIG. 3B, the model space 310 includes, in addition to the graphics objects 320 and 330, markers 360 and 370 to identify the cylinder 330. The markers 360 and 370 are defined as spheres at different positions in the model space. The spheres of the different markers can be identical or different. (In FIG. 3B, open and solid circles are used to differentiate the two spheres for illustrational purposes only.) In alternative implementations, the markers can be defined as points or any other objects.

The marker 360 is defined for the top view 340 and the marker 370 is defined for the side view 350. Accordingly, the marker 360 is defined at a position that is inside the prism from which the top view 340 is derived and outside the prism from which the side view 350 is derived. Similarly, the marker 370 is defined at a position that is inside the prism of the side view 350 and outside the prism of the top view 340.

In the model space 310, graphics objects are ordered according to a processing sequence 318. In the processing sequence 318, the sphere 320 is processed first. Next the markers 360 and 370 are processed, followed by the cylinder 330, and finally the markers 360 and 370 are processed for the second time. The processing sequence 318 can be explicitly specified or predefined, for example, to follow an order in which the objects were created. A marked representation having the processing sequence 318 can be generated, e.g., using the method 200 (FIG. 2), where the system creates copies of each object in the model space in a desired order.

The two copies of the marker 360 are defined to bracket the cylinder 330 in an object stream 348 for the top view, and the two copies of the marker 370 are defined to bracket the cylinder 330 in an object stream 358 for the side view. The object stream 348 can be generated for the top view 340 according to the processing sequence 318. The object stream 348 includes, in addition to the projected objects 321 and 331 describing the sphere 320 and the cylinder 330, respectively, projected markers 361 and 362 corresponding to the marker 360 in the top view 340. The marker 370 is not in the top view 340, and therefore not included in the object stream 348 corresponding to the top view. The projected markers 361 and 362 bracket the projected object 331 in the object stream 348. By identifying the projected markers 361 and 362, the projected object 331 can be identified in the object stream 348 as the projected object describing the cylinder 330. The cylinder 330 can be identified even though the projected object 331 has a shape that is distorted in the top view 340.

Similarly, the object stream 358 can be generated for the side view 350 according to the processing sequence 318. The object stream 358 includes, in addition to the projected objects 322 and 332 describing the sphere 320 and the cylinder 330, respectively, projected markers 371 and 372 corresponding to the marker 370 in the side view 350. The marker 360 is not in the side view 350, and therefore not included in the object stream 358 corresponding to the side view. The projected markers 371 and 372 bracket the projected object 332 in the object stream 358. By identifying the projected markers 371 and 372, the projected object 332 can be identified in the object stream 358 as the projected object describing the cylinder 330. The cylinder 330 can be identified even though the projected object 332 has a shape that is distorted in the side view 350 and is different than the projected object 331 describing the cylinder in the top view 340.

In the object streams 348 and 358, after identifying the cylinder 330, the projected markers can be replaced by tags to markup the cylinder 330. After the replacement, the projected markers will not be visible in an image generated from the object streams 348 and 358 by a 2D application, but the properties of the cylinder 330 can be selectively altered. For example, the cylinder 330 can be highlighted by changing its color, selectively printed, or (gradually) made disappear by changing its opacity.

In alternative implementations, instead of a single object (such as the cylinder 330), multiple graphics objects can be associated with markers in the model space. In one implementation, a different marker is used for each of the multiple objects. Different markers allow identifying each of the multiple objects individually. Alternatively or in addition, a common marker can be used for a group of two or more objects. The common marker allows identifying each of the two or more objects as a member of the group.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

By way of example, a printing device implementing an interpreter for a page description language, such as the PostScript® language, includes a microprocessor for executing program instructions (including font instructions) stored on a printer random access memory (RAM) and a printer read-only memory (ROM) and controlling a printer marking engine. The RAM is optionally supplemented by a mass storage device such as a hard disk. The essential elements of a computer are a processor for executing instructions and a memory. A computer can generally also receive programs and data from a storage medium such as an internal disk or a removable disk. These elements will also be found in a conventional desktop or workstation computer as well as other computers suitable for executing computer programs implementing the methods described here, which can be used in conjunction with any digital print engine or marking engine, display monitor, or other raster output device capable of producing color or gray scale pixels on paper, film, display screen, or other output medium.

The invention has been described in terms of particular embodiments. Other embodiments are within the scope of the following claims. For example, the steps of the invention can be performed in a different order and still achieve desirable results.

What is claimed is:

1. A computer-implemented method for processing graphics objects in a model space having more than two dimensions, the method comprising:

performing operations by a programmable processor of a computer, the operations comprising:

receiving information in the computer specifying a first view of the model space, the first view being defined by a first projection of a first subspace of the model space onto a two-dimensional space, the first subspace having more than two dimensions, the first subspace including at least a portion of each of two or more original graphics objects, each of the two or more original graphics objects having a sequential position in a processing sequence for the first view, the processing sequence specifying a temporal order of appearance of the graphics objects in the first subspace, wherein the temporal order of appearance of the graphics objects is based on creation time of each of the graphics objects in the model space;

determining to mark a first original graphics object and a second original graphics object in the first subspace and then adding to the first subspace at least a first marker corresponding to the first original graphics object and a second marker corresponding to the second original graphics object, each marker being a graphics object at a first position within the first subspace wherein the first position is spatially fixed with respect to the corresponding original graphics object, and wherein the position of the first marker in the first subspace is independent of the position of the second marker in the first subspace, and wherein the appearance of each marker is temporally adjacent to its corresponding original graphics object based on the processing sequence for the first view, the position of each marker identifying the corresponding original graphics object in the processing sequence for the first view;

generating a distinct first projected object for each respective original graphics object in the first subspace by applying the first projection to the respective original graphics object in the first subspace and generating one or more first projected markers for each respective marker in the first subspace by applying the first projection, used to project each respective original graphics object, to project the respective marker from the corresponding fixed spatial position in the first subspace to a projected position in the two-dimensional space; and generating an object stream that includes the distinct first projected objects and first projected markers, the object stream being a serialization of the distinct first projected objects and the first projected markers, the distinct first projected objects and the first projected markers being arranged in the object stream according to the processing sequence for the first view, wherein the first projected marker corresponding to each marker is adjacent to the first projected object corresponding to the object marked by the marker in the object stream.

2. The method of claim 1, further comprising:
receiving information in the computer specifying one or more further views of the model space, each of the further views being defined by a further projection of a further subspace of the model space onto the two-dimensional space, and
wherein the one or more first positions are positions that are outside all of the subspaces corresponding to any of the further views.

3. The method of claim 2, further comprising:
defining two or more markers for a second view of the model space, the second view being defined by a second projection of a second subspace of the model space, the second subspace including at least a portion of each of two or more graphics objects, each of the two or more graphics objects having a sequential position in a processing sequence for the second view, each marker for the second view having one or more sequential positions among the graphics objects in the processing sequence for the second view, each of the one or more sequential positions of each marker for the second view identifying at least one corresponding graphics object in the processing sequence for the second view, each of the two or more markers for the second view being defined as a graphics object at one or more second positions within the second subspace, the one or more second positions being positions that are outside all of the subspaces corresponding to other views of the model space.

4. The method of claim 3, wherein:
generating an object stream includes generating a distinct second projected object for each respective graphics object in the second subspace by applying the second projection to the respective graphics object in the second subspace, generating one or more second projected markers for each respective marker in the second subspace by applying the second projection to the respective marker in the second subspace, and generating an object stream that includes the distinct second projected objects and second projected markers, the distinct second projected objects and second projected markers being arranged in the object stream according to the processing sequence for the second view.

5. The method of claim 1 further comprising:
sequentially creating a copy of each of the original graphics objects in the first subspace according to the processing sequence of the first view, the copy of each original graphics object having the same dimensions as the dimensions of the original graphics object, and creating a copy of a marker in the first subspace, the copy of the marker corresponding to at least one of the copies of the original graphics objects in the processing sequence.

6. The method of claim 1, wherein:
generating an object stream includes generating a print stream representing the first view in the two-dimensional space.

7. The method of claim 1, further comprising:
generating a representation of the first view based on the object stream.

8. The method of claim 7, wherein:
the representation of the first view includes a two dimensional projection of at least a portion of each of the original graphics objects in the first subspace.

9. The method of claim 7, wherein generating a representation of the first view includes:
identifying each of the first projected markers for the first view in the object stream; and
identifying the first projected graphics objects in the object stream using a predefined relationship between the identified first projected markers and the identified first projected graphics objects in the object stream.

10. The method of claim 9, wherein:
generating a representation of the first view includes, for each identified marker, replacing the identified marker with a tag, each tag being associated with one or more of the identified first projected graphics objects in the representation.

11. The method of claim 10, further comprising:
using the tags to select one or more of the identified first projected graphics objects in the representation, the selected first projected graphics objects having one or more attributes; and
altering one or more of the attributes of the selected first projected graphics objects.

12. The method of claim 11, wherein the one or more attributes of the selected first projected objects include color and/or opacity of one or more of the selected first projected objects.

13. A non-transitory memory encoded with software for processing graphics objects in a model space having more than two dimensions, the software comprising instructions that when executed by a programmable processor of a computer cause the computer to perform operations comprising:
receiving information in the computer specifying a first view of the model space, the first view being defined by a first projection of a first subspace of the model space onto a two dimensional space, the first subspace having more than two dimensions, the first subspace including at least a portion of each of two or more original graphics objects, each of the two or more original graphics objects having a sequential position in a processing sequence for the first view, the processing sequence specifying a temporal order of appearance of the graphics objects in the first subspace, wherein the temporal order of appearance of the graphics objects is based on creation time of each of the graphics objects in the model space;
determining to mark a first original graphics object and a second original graphics object in the first subspace and then adding to the first subspace at least a first marker corresponding to the first original graphics object and a second marker corresponding to the second original graphics object, each marker being a graphics object at a first position within the first subspace wherein the first position is spatially fixed with respect to the corresponding original graphics object, and wherein the position of the first marker in the first subspace is independent of the position of the second marker in the first subspace, and wherein the appearance of each marker is temporally adjacent to its corresponding original graphics object based on the processing sequence for the first view, the position of each marker identifying the corresponding first original graphics object in the processing sequence for the first view;
generating a distinct first projected object for each respective original graphics object in the first subspace by applying the first projection to the respective original graphics object in the first subspace and generating one or more first projected markers for each respective marker in the first subspace by applying the first projection, used to project each respective original graphics object, to project the respective marker from the respective marker's relatively fixed spatial position in the first subspace to a projected position in the two-dimensional space; and generating an object stream that includes the distinct first projected objects and first projected markers, the distinct first projected objects and the first projected markers being arranged in the object stream according to the processing sequence for the first view, wherein the first projected marker corresponding to each marker is adjacent to the first projected object corresponding to the object marked by the marker in the object stream.

14. The non-transitory memory encoded with the software of claim 13, the software further comprising instructions that when executed by the programmable processor cause the computer to perform operations comprising:

receiving information in the computer specifying one or more further views of the model space, each of the further views being defined by a further projection of a further subspace of the model space onto the two-dimensional space, and wherein the one or more first positions are positions that are outside all of the subspaces corresponding to any of the further views.

15. The non-transitory memory encoded with the software of claim 14, the software further comprising instructions that when executed by the programmable processor cause the computer to perform operations comprising:

defining two or more markers for a second view of the model space, the second view being defined by a second projection of a second subspace of the model space, the second subspace including at least a portion of each of two or more graphics objects, each of the two or more graphics objects having a sequential position in a processing sequence for the second view, each marker for the second having one or more sequential positions among the graphics objects in the processing sequence for the second view, each of the one or more sequential positions of each marker for the second view identifying at least one corresponding graphics object in the processing sequence for the second view, each of the two or more markers for the second view being defined as a graphics object at one or more second positions within the second subspace, the one or more second positions being positions that are outside all of the subspaces corresponding to other views of the model space.

16. The non-transitory memory encoded with the software of claim 15, wherein:

generating an object stream includes generating a distinct second projected object for each respective graphics object in the second subspace by applying the second projection to the respective graphics object in the second subspace, generating one or more second projected markers for each respective marker in the second subspace by applying the second projection to the respective marker in the second subspace, and generating an object stream that includes the distinct second projected objects and second projected markers, the distinct second projected objects and second projected markers being arranged in the object stream according to the processing sequence for the second view.

17. The non-transitory memory encoded with the software of claim 13 further comprising:

sequentially creating a copy of each of the original graphics objects in the first subspace according to the processing sequence of the first view, the copy of each original graphics object having the same dimensions as the dimensions of the original graphics object, and creating a copy of a marker in the first subspace, the copy of the marker corresponding to at least one of the copies of the original graphics objects in the processing sequence.

18. The non-transitory memory encoded with the software of claim 13, wherein:

generating an object stream includes generating a print stream representing the first view in the two-dimensional space.

19. The non-transitory memory encoded with the software of claim 13, the software further comprising instructions that when executed by the programmable processor cause the computer to perform operations comprising:

generating a representation of the first view based on the object stream.

20. The non-transitory memory encoded with the software of claim 19, wherein:

the representation of the first view includes a two dimensional projection of at least a portion of each of the original graphics objects in the first subspace.

21. The non-transitory memory encoded with the software of claim 19, wherein generating a representation of the first view includes:

identifying each of the first projected markers for the first view in the object stream; and identifying the first projected graphics objects in the object stream using a predefined relationship between the identified first projected markers and the identified first projected graphics objects in the object stream.

22. The non-transitory memory encoded with the software of claim 21, wherein:

generating a representation of the first view includes, for each identified marker, replacing the identified marker with a tag, each tag being associated with one or more of the identified first projected graphics objects in the representation.

23. The non-transitory memory encoded with the software of claim 22, the software further comprising instructions that when executed by the programmable processor cause the computer to perform operations comprising:

using the tags to select one or more of the identified first projected graphics objects in the representation, the selected first projected graphics objects having one or more attributes; and altering one or more attributes of the selected first projected graphics objects.

24. The non-transitory memory encoded with the software of claim 23, wherein the one or more attributes of the selected first projected objects include color and/or opacity of one or more of the selected first projected objects.

25. A system for processing graphics objects in a model space having more than two dimensions, the system comprising:

a processor;

a non-volatile memory storing instructions that, when executed by the processor, cause the processor to perform operations comprising:

receiving information specifying a first view of the model space, the first view being defined by a first projection of a first subspace of the model space onto a two dimensional space, the first subspace having more than two dimensions, the first subspace including at least a portion of each of two or more original graphics objects, each of the two or more original graphics objects having a sequential position in a processing sequence for the first view, the processing sequence specifying a temporal order of appearance of the graphics objects in the first subspace, wherein the temporal order of appearance of the graphics objects is based on creation time of each of the graphics objects in the model space;

determining to mark a first original graphics object and a second original graphics object in the first subspace and then adding to the first subspace at least a first marker corresponding to the first original graphics object and a second marker corresponding to the second original graphics object, each marker being a graphics object at a first position within the first subspace wherein the first position is spatially fixed with respect to the corresponding original graphics object, and wherein the position of the first marker in the graphics space is independent of the position of the second marker in the graphics space, and wherein the appearance each marker is temporally adjacent to its corresponding original graphics object based on the processing sequence for the first view, the position of each marker identifying the corresponding graphics object in the processing sequence for the first view;

generating a distinct first projected object for each respective original graphics object in the first subspace by applying the first projection to the respective original graphics object in the first subspace and generating one or more first projected marker for each respective marker in the first subspace by applying the first projection, used to project each respective original graphics object, to project the respective marker from the corresponding fixed spatial position in the first subspace to a projected position in the two-dimensional space; and generating an object stream that includes the distinct first projected objects and first projected markers, the object stream being a serialization of the distinct first projected objects and the first projected markers, the distinct first projected objects and the first projected markers being arranged in the object stream according to the processing sequence for the first view, wherein the first projected marker corresponding to each marker is adjacent to the first projected object corresponding to the object marked by the marker in the object stream.

26. The system of claim 25, further configured to perform operations comprising:
receiving information specifying one or more further views of the model space, each of the further views being defined by a further projection of a further subspace of the model space onto the two-dimensional space, and wherein the one or more first positions are positions that are outside all of the subspaces corresponding to any of the further views.

27. The system of claim 26, further configured to perform operations comprising:
defining two or more markers for a second view of the model space, the second view being defined by a second projection of a second subspace of the model space, the second subspace including at least a portion of each of two or more graphics objects, each of the two or more graphics objects having a sequential position in a processing sequence for the second view, each marker for the second view having one or more sequential positions among the graphics objects in the processing sequence for the second view, each of the one or more sequential positions of each marker for the second view identifying at least one corresponding graphics object in the processing sequence for the second view, each of the two or more markers for the second view being defined as a graphics object at one or more second positions within the second subspace, the one or more second positions being positions that are outside all of the subspaces corresponding to other views of the model space.

28. The system of claim 27, wherein:
generating an object stream includes generating a distinct second projected object for each respective graphics object in the second subspace by applying the second projection to the respective graphics object in the second subspace, generating one or more second projected markers for each respective marker in the second subspace by applying the second projection to the respective marker in the second subspace, and generating an object stream that includes the distinct second projected objects and second projected markers, the distinct second projected objects and second projected markers being arranged in the object stream according to the processing sequence for the second view.

29. The system of claim 25, further configured to perform operations comprising:
sequentially creating a copy of each of the original graphics objects in the first subspace according to the processing sequence of the first view, the copy of each original graphics object having the same dimensions as the dimensions of the original graphics object, and creating a copy of a marker in the first subspace, the copy of the marker corresponding to at least one of the copies of the original graphics objects in the processing sequence.

30. The system of claim 25, wherein:
generating an object stream includes generating a print stream representing the first view in the two-dimensional space.

31. The system of claim 25, further configured to perform operations comprising:
generating a representation of the first view based on the object stream.

32. The system of claim 31, wherein:
the representation of the first view includes a two dimensional projection of at least a portion of each of the original graphics objects in the first subspace.

33. The system of claim 31, wherein generating a representation of the first view includes:
identifying each of the first projected markers for the first view in the object stream; and
identifying the first projected graphics objects in the object stream using a predefined relationship between the identified first projected markers and the identified first projected graphics objects in the object stream.

34. The system of claim 33, wherein:
generating a representation of the first view includes for each identified marker, replacing the identified marker with a tag, each tag being associated with one or more of the identified graphics objects in the representation.

35. The system of claim 34, further configured to perform operations comprising:
using the tags to select one or more of the identified first projected graphics objects in the representation, the selected first projected graphics objects having one or more attributes; and
altering one or more of the attributes of the selected objects.

36. The system of claim 35, wherein the one or more attributes of the selected first projected objects include color and/or opacity of one or more of the selected first projected objects.

37. The method of claim 1, wherein each of the markers for the first view is a high symmetry object whose projected shape in a view is independent of a direction of the projection defining the view.

38. The non-volatile memory encoded with the software of claim 13, wherein each of the markers for the first view is a high symmetry object whose projected shape in a view is independent of a direction of the projection defining the view.

39. The system of claim 25, wherein each of the markers for the first view is a high symmetry object whose projected shape in a view is independent of a direction of the projection defining the view.

40. The method of claim 1, wherein adding to the first subspace at least a first marker corresponding to the first original graphics object comprises adding a before marker and an after marker that delineate the first graphics object by the before marker immediately preceding and the after marker immediately following the first graphics object in the processing sequence.

41. The non-transitory memory encoded with the software of claim 13, wherein adding to the first subspace at least a first marker corresponding to the first original graphics object comprises adding a before marker and an after marker that delineate the first graphics object by the before marker immediately preceding and the after marker immediately following the first graphics object in the processing sequence.

42. The system of claim 25, wherein adding to the first subspace at least a first marker corresponding to the first original graphics object comprises adding a before marker and an after marker that delineate the first graphics object by the before marker immediately preceding and the after marker immediately following the first graphics object in the processing sequence.

43. The method of claim 1, wherein the first marker corresponding to the first original graphics object delineates the first graphics object by the first marker having a predefined relationship immediately preceding or following the first graphics object in the processing sequence.

44. The non-transitory memory encoded with the software of claim 13, wherein the first marker corresponding to the first original graphics object comprises delineates the first graphics object by the first marker having a predefined relationship immediately preceding or following the first graphics object in the processing sequence.

45. The system of claim 25, wherein the first marker corresponding to the first original graphics object delineates the first graphics object by the first marker having a predefined relationship immediately preceding or following the first graphics object in the processing sequence.

46. The method of claim 1, wherein each marker identifies the first view.

47. The non transitory memory encoded with the software of claim 13, wherein each marker identifies the first view.

48. The system of claim 25, wherein each marker identifies the first view.

* * * * *